United States Patent [19]
Kowalski

[11] 4,410,298
[45] Oct. 18, 1983

[54] FASTENER

[75] Inventor: Joseph W. Kowalski, Florissant, Mo.

[73] Assignee: B-Line Systems, Inc., Highland, Ill.

[21] Appl. No.: 192,942

[22] Filed: Oct. 2, 1980

[51] Int. Cl.³ ............................................ F16B 37/04
[52] U.S. Cl. ..................................... 411/112; 411/104
[58] Field of Search ............... 411/112, 111, 104, 103, 411/113, 132, 352, 360

[56] References Cited

U.S. PATENT DOCUMENTS

| | | |
|---|---|---|
| 1,306,100 | 6/1919 | Chadwick . |
| 2,940,496 | 6/1960 | Patten ................................. 411/112 |
| 3,009,499 | 11/1961 | Weihe ................................. 411/112 |
| 3,091,272 | 5/1963 | Patten ................................. 411/112 |
| 3,192,982 | 7/1965 | Rohe et al. ......................... 411/104 |
| 3,483,910 | 12/1969 | LaLonde et al. . |
| 3,493,025 | 2/1970 | LaLonde et al. . |
| 4,146,074 | 3/1979 | Kowalski . |
| 4,263,952 | 4/1981 | Kowalski ............................ 411/112 |

FOREIGN PATENT DOCUMENTS

| | | |
|---|---|---|
| 513368 | 10/1939 | United Kingdom . |
| 1061146 | 8/1963 | United Kingdom . |

*Primary Examiner*—Ramon S. Britts

*Attorney, Agent, or Firm*—Senniger, Powers, Leavitt and Roedel

[57] ABSTRACT

A fastener for securing parts to metal framing (e.g., channel framing) having side flanges with inwardly turned, hook-shaped lips defining a slot therebetween. The fastener comprises an elongate body or nut having inside and outside faces, opposite sides and opposite ends, a width less than that of the slot and a length greater than the width of the slot. The fastener also includes a clamp member secured to the body having portions generally adjacent opposite sides of the body engageable with the outside face of the framing when the body is aligned with, entered into and passed through the slot in the framing. These portions remain substantially stationary with respect to the body when the latter is turned to its crosswise position. The clamping member also has resilient clamping portions generally adjacent opposite ends of the body engageable with the outside face of the framing when the body is turned to its crosswise position. These clamping portions spring away from the outside face of the body when it is turned to its crosswise position for providing a spring action tending to draw the body into clamping engagement with the inside face of the framing.

16 Claims, 5 Drawing Figures

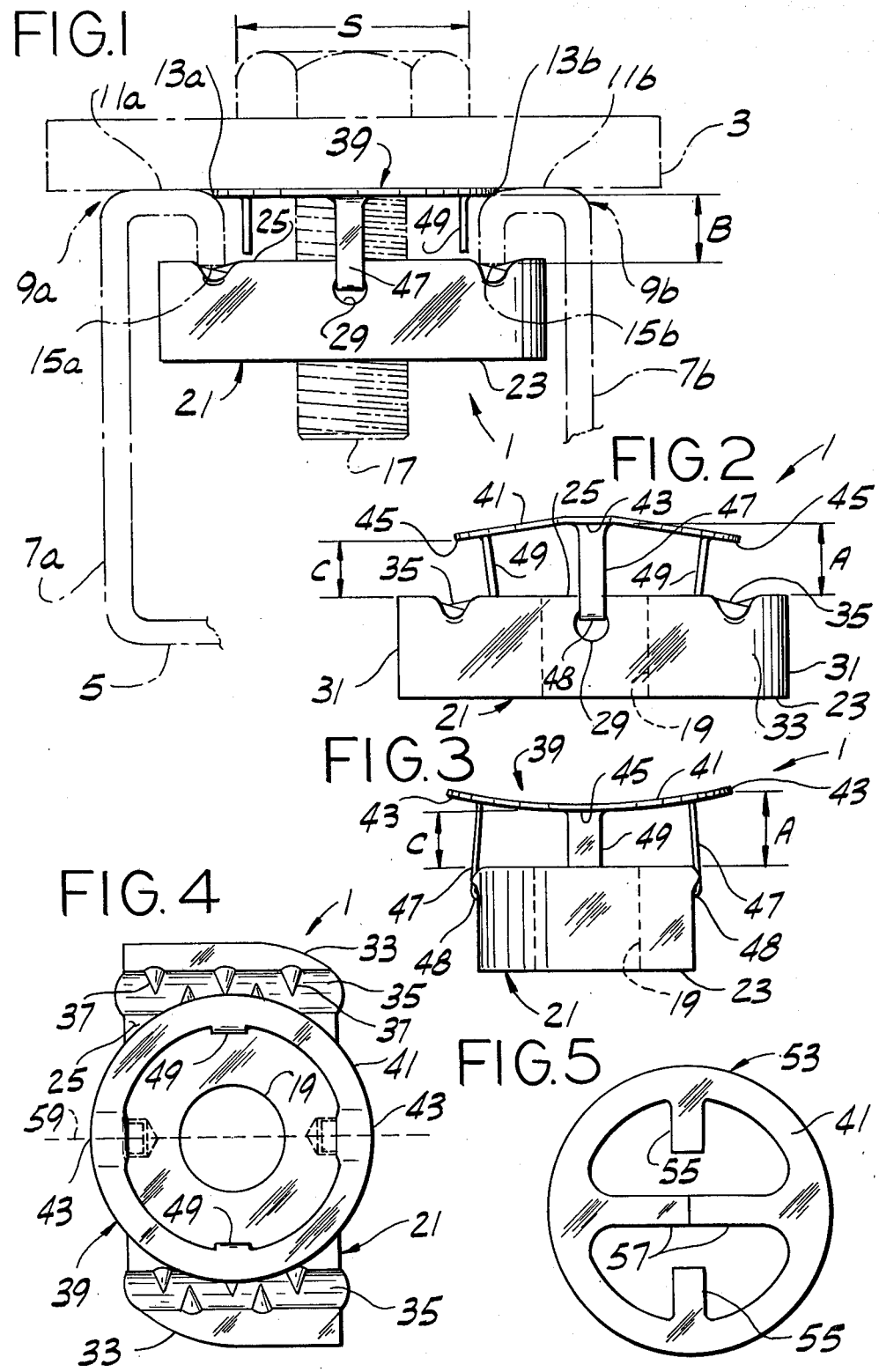

FASTENER

BACKGROUND OF THE INVENTION

This invention relates generally to fasteners for fastening objects to metal channel framing and, more particularly, to a nut having means thereon for clamping the nut to the channel prior to and during securement of the object to the channel.

Electrical conduit, pipes, fixtures, etc. are commonly supported overhead or vertically by channel framing conventionally having side flanges with inwardly turned, hook-shaped lips defining a slot therebetween. Typically, an elongate nut (narrower but longer than the width of the slot) is used for securing objects to the channel, the nut first being aligned with, entered into and passed through the slot, and then turned 90° to a crosswise position with the outside face of the nut engaging the inside faces of the channel lips. Various means have heretofore been used for holding the nut against the channel in its crosswise position prior to and during securement of an object to the channel.

One such means is a coil compression spring on the inside face of the nut. Upon insertion of the nut in the slot in the channel, this spring reacts against the channel bottom and pushes the nut against the channel lips. This arrangement has several serious disadvantages, however, one being that each channel of different depth requires a spring of correspondingly different length, thus greatly increasing the number of fastener sizes which have to be stocked. Moreover, while securing objects to the framing, the nuts tend to tilt and topple over into the channel. It is also difficult to use the channel as a raceway for conduit, wires or the like since the spring substantially blocks the entire channel.

Another prior art means for holding the nut against the channel is a coil spring attached to the outside face of the nut for spanning the slot in the channel and pulling the nut into engagement with the channel lips. This means also has its drawbacks, however, inasmuch as the spring tends to slip off the lips of the channel and the nut to fall into the channel.

Yet another prior art means is a cradle for the nut having spring fingers or lugs extending outwardly from the outside face of the nut at opposite ends thereof. The lugs are engageable with the outside faces of the channel lips to pull the nut into engagement with the inside faces of the channel lips upon turning the nut to its crosswise position. The cradle, however, lacks means extending beyond the sides of the nut to prevent it from falling into the channel upon insertion of the nut into the slot in the channel.

The fasteners disclosed in my U.S. Pat. No. 4,146,074, issued Mar. 27, 1979, and my co-pending U.S. patent application Ser. No. 76,461, filed Sept. 17, 1979, now U.S. Pat. No. 4,285,379, solve the aforementioned problems in that they provide a clear channel for carrying conductors and remain securely in place on the channel prior to and during securement of an object to the channel. However, while the installation and use of these fasteners have been entirely satisfactory, their manufacture is relatively costly. For example, in the manufacture of the fastener disclosed in my U.S. Pat. No. 4,146,074 a separate machining step is required to cut slots in the sides of the nut, and in the manufacture of the fastener disclosed in my co-pending U.S. patent application Ser. No. 76,461, a clamp member and a separate retainer member must be stamped from blanks of sheet metal and then assembled with the nut to form the fastener.

Reference may be made to U.S. Pat. Nos. 1,306,100 and 3,483,910, and British Pat. Nos. 513,368 and 1,061,149, all of which disclose fasteners of the same general type as that of the fastener of this invention.

SUMMARY OF THE INVENTION

Among the several objects of this invention may be noted the provision of a fastener which is readily installed on a channel and self-retaining thereafter; the provision of such a fastener which remains securely in place on the channel prior to and during securement of an object to the channel; the provision of such a fastener which provides a clear channel for carrying an increased number of conductors; the provision of such a fastener which fits channels of all depths, thus reducing the number of fastener sizes which need to be stocked; and the provision of such a fastener which is economical to produce and easy to assemble.

Briefly, an improved fastener of this invention, which is useful for securing an object or a part to metal framing having a slot and inside and outside faces on opposite sides of the slot, comprises an elongate body having an inside and an outside face, opposite sides and opposite ends. The width of the body is less than that of the slot in the framing whereby the body may be generally aligned with the slot, entered into the slot and passed through the slot from the outside to the inside of the framing and then turned to extend in crosswise position for engagement of portions of the outside face of the body adjacent the ends of the body with the inside face of the framing at opposite sides of the slot. The fastener further includes means for clamping the body in place in its crosswise position comprising a clamp member secured to the body. The clamp member has portions generally adjacent opposite sides of the body engageable with the outside face of the framing when the body is aligned with, entered into and passed through said slot, the portions remaining substantially stationary with respect to the outside face of the body when the latter is turned to its crosswise position. The clamp member also has resilient clamping portions generally adjacent opposite ends cf the body engageable with the outside face of the framing when the body is turned to its crosswise position. The clamping portions, when unstressed, are spaced from the outside face of the body a distance less than the distance between the inside and outside faces of the framing and are adapted to spring away from the outside face of the body when the latter is turned to its crosswise position for providing a spring action tending to draw the body into clamping engagement with the inside face of the framing on opposite sides of the slot.

Other objects and features will be in part apparent and in part pointed out hereinafter.

BRIEF DESCRIPTION OF THE DRAWINGS

FIG. 1 is an elevation of a part secured to channel framing by means of a fastener of this invention;

FIG. 2 is a side elevation of the fastener of FIG. 1 showing it removed from the channel;

FIG. 3 is an end elevation of the fastener of FIG. 2;

FIG. 4 is a top plan of the fastener of FIG. 2; and

FIG. 5 is a plan of a sheet metal stamping adapted to be formed into a clamp member of the fastener of FIG. 2.

DESCRIPTION OF A PREFERRED EMBODIMENT

Referring now to the drawings, particularly to FIG. 1, a fastener of this invention is indicated in its entirety at 1 and is shown securing a part 3 (such as a bracket) to a metal channel framing or support 5. This channel has a pair of side flanges 7a, 7b, the outer (upper) ends of which have inwardly directed lips formed thereon as indicated generally at 9a and 9b. These lips are hook-shaped, having outside faces with flat portions 11a, 11b and curved portions 13a, 13b. The lips terminate in inside edges 15a, 15b, and are spaced from one another to define a slot S therebetween which extends the length of the channel. As illustrated, the part 3 spans slot S and bears on the flat portions 11a, 11b of the outside face of the channel lips at opposite sides of the slot, the part being locked in position by means of a conventional bolt 17 extending through the part and threaded into a tapped bore 19 in fastener 1.

More particularly, the fastener 1 comprises an elongate body or nut generally designated 21 having an inside (lower) face 23, an outside (upper) face 25, opposites sides 27 each having a blind end hole 29 therein, and opposite ends 31. While the length of the nut 21 is greater than the width of the channel slot S (but less than the distance between channel side flanges 7a, 7b), the width of the nut is less than the width of slot S so that the nut may be inserted in the slot in alignment therewith and turned to a crosswise position in the channel for installing the fastener 1 on the channel 5 in a manner more fully described hereinafter. Diagonally opposite corners of the nut 21 are rounded as indicated at 33 for facilitating such installation. The nut has parallel grooves 35 extending across its upper face 25 adjacent the ends 31 thereof, each groove having upstanding teeth 37 therein engageable with the inner edges 15a, 15b of the channel lips to assure that the fastener remains in position on the channel (even a vertical channel) when installed.

The fastener 1 further comprises a clamp member, generally indicated at 39, secured to the nut 21 for clamping the nut in place when the fastener is installed on a channel. As will appear, the clamp member 39 is secured to the nut for rotation therewith without substantially impeding rotation of the nut to its crosswise (FIG. 1) position. As shown in FIGS. 2–4, the clamp member comprises a ring 41 spaced outwardly of the outside face 25 of the nut, the outer diameter of the ring being greater than the width of the nut but less than the length of the nut and the inner diameter of the ring being substantially equal to the width of the nut. The ring has diametrically opposite portions 43 generally adjacent opposite sides of the nut 21 engageable with the curved portions 13a, 13b of the channel lips when the fastener is inserted into the slot S in the channel, and diametrically opposite resilient clamping portions 45 generally adjacent the ends 31 of the nut engageable with the curved portions of the channel lips when turning the nut 21 to its crosswise position to install the fastener on the channel.

Clamp member 39 has a pair of arms 47 extending inwardly from the inner periphery of the ring at opposite sides of the nut 21. These arms have in-turned portions 48 at their inner (lower) ends received in holes 29 in the sides of the nut for securing the clamp member 39 to the nut. A pair of legs 49 extending inwardly from the resilient clamping portions 45 of the ring are engageable with the outer (upper) face of the nut for maintaining the ring spaced away from the nut and generally parallel thereto when the fastener is not installed on a channel.

Preferably, the clamp member 39 is formed from a flat stamping, indicated at 53 in FIG. 5, of a suitable sheet metal such as tempered carbon 1060 steel. The stamping 53 has a pair of relatively short projections 55 extending radially inwardly from the inner periphery of the ring 41. When bent inwardly, these projections 55 form legs 49. The stamping also has a pair of projections 57 spanning the inner diameter of the ring, each projection having a length equal to one-half the inner diameter of the ring. When bent inwardly, these projections 57 form arms 47.

In accordance with this invention, ring 41 is bent to slope inwardly toward opposite ends of the nut from a diametrical axis 59 extending through the portions 43 of the ring, the latter of which are spaced from the outside face 25 of the nut a distance (indicated at A in FIGS. 2 and 3) substantially equal to the distance indicated at B in FIG. 1) between the inside edges 15a, 15b and the curved portions 13a, 13b of the channel lips. The resilient clamping portions 45, when in unstressed condition as shown in FIGS. 2 and 3, are maintained spaced from the nut by legs 49 a distance (indicated at C in FIGS. 2 and 3) less than distances A and B. Thus, with the nut 21 inserted in the channel slot S and with the portions 43 of the ring in engagement with the curved portions 13a, 13b of the channel lips, the outside face 25 of the nut is held by the arms 47 at or inwardly of the plane of the inside edges 15a, 15b of the channel lips. When the nut is turned to its crosswise position, the portions 43 of the ring are held substantially stationary with respect to the outside face of the nut by the arms 47, while the resilient clamping portions 45 spring outwardly to the distance B for providing a spring action tending to draw the nut 21 into clamping engagement with the inside edges 15a, 15b of the channel lips.

To install the fastener 1 on the channel 5, the nut is aligned with, entered into and passed through slot S from the outside to the inside thereof until the portions 43 of the ring engage the curved portions 13a, 13b of the outer faces of the channel lips. The nut is then rotated a quarter turn to the right (i.e., clockwise) to a position in which the nut extends crosswise with respect to slot S. The rounded corners 33 of the nut facilitate rotation of the nut to this crosswise position, further rotation being prevented by the unreduced square corners of the nut. This ensures proper alignment of the serrated grooves 35 with the channel edges 15a, 15b and assists in holding the nut against further turning as bolt 17 is tightened. During the rotation of the nut, the portions 43 of the nut are held, via arms 47, substantially stationary with respect to the outside face 25 of the nut, and the resilient clamping portions 45 bend or spring away from the outside face of the nut from distance C to distance B, as shown in FIG. 1. A spring force is thus developed tending to draw the nut into clamping engagement with the inside edges 15a, 15b of the channel lips. Fastener 1 may quickly and easily removed from the channel 5 (as for reuse) by reversing the steps as set out above.

Thus, it will be observed that the fastener 1 of this invention is readily installed on a channel support and self-retaining thereon after installation. Moreover, the fastener may be used with a channel of any depth and leaves the channel clear of obstructions for freely carrying conductors or the like.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For securement to metal framing having a slot and inside and outside faces on opposite sides of the slot for attachment of parts to the framing through the slot from the outside of the slot, a fastener comprising:
   an elongate body having a first face constituting an inside face and an opposite face consituting an outside face, opposite sides, and opposite ends, the width of said body between said sides being less than the width of the slot in the framing whereby the body may be generally aligned with the slot, entered into the slot and passed through the slot from the outside to the inside of the framing and then turned to extend in crosswise position relative to the slot for engagement of portions of the outside face of the body adjacent the ends of the body with the inside face of the framing at opposite sides of the slot; and
   means for clamping the body in place in its said crosswise position comprising an annular clamp member of relatively thin resilient material secured to the body on the outside face thereof, said clamp member having portions generally adjacent opposite sides of the body engageable with the outside face of the framing when the body is aligned with, entered into and passed through said slot, said portions remaining substantially stationary with respect to the outside face of the body when the latter is turned to its crosswise position, said clamp member also having resilient clamping portions generally adjacent opposite ends of the body engageable with the outside face of the framing when the body is turned to its said crosswise position, said clamping portions, when unstressed, being spaced closer to the outside face of the body than are said substantially stationary portions and being adapted resiliently to bend away from the outside face of the body when the latter is turned to its crosswise position for providing a spring action tending to draw the body into clamping engagement with the inside face of the framing on opposite sides of the slot.

2. A fastener as set forth in claim 1 wherein said portions of the clamp member generally adjacent the sides of the body are spaced outwardly from the outside face of the body a distance greater than said distance between said clamping portions and the outside face of the body.

3. A fastener as set forth in claim 2 wherein said distance between said portions of the clamp member generally adjacent the sides of the body and the outside face of the body is substantially equal to said distance between the inside and outside faces of the framing.

4. A fastener as set forth in claim 3 wherein the clamp member has means for holding said portions of the clamp member generally adjacent the sides of the body substantially stationary with respect to the outside face of the body when the body is turned to said crosswise position.

5. A fastener as set forth in claim 4 wherein said clamp member has means for maintaining said clamping portions spaced away from the outside face of the body.

6. A fastener as set forth in claim 5 wherein said clamp member comprises a ring spaced away from the outside face of said body.

7. A fastener as set forth in claim 6 wherein said holding means comprises a pair of arms extending from said ring at opposite sides of the body, each arm having an in-turned portion at its inner end received in a hole in a respective side of the body.

8. A fastener as set forth in claim 7 wherein the outer diameter of the ring is greater than the width of the body but less than the length of the body, the inner diameter of the ring being substantially equal to the width of the body.

9. A fastener as set forth in claim 8 wherein the length of each of said arms as measured from the ring to its said in-turned portion and along its said in-turned portion is substantially equal to one-half of the inside diameter of the ring.

10. A fastener as set forth in claim 9 wherein said means for maintaining said clamping portions spaced away from the outside face of the body comprises a pair of legs extending inwardly from the ring for engagement with the outside face of the body.

11. A fastener as set forth in claim 10 wherein said arms and legs are integral with said ring and extend from the inner periphery thereof toward the body.

12. A fastener as set forth in claim 1 wherein the clamp member comprises a ring spaced outwardly from the outside face of the body.

13. A fastener as set forth in claim 10 wherein the outer diameter of the ring is greater than the width of the body but less than the length of the body, the inner diameter of the ring being substantially equal to the width of the body.

14. A fastener as set forth in claim 12 wherein said clamping portions comprise opposite portions of said ring bent to slope inwardly toward the outside face of the body.

15. A fastener as set forth in claim 14 wherein said ring has a diametrical axis extending transversely with respect to said body, said opposite portions of the ring sloping inwardly from said axis on opposite sides thereof toward the outside face of the body at opposite ends of the body.

16. A fastener as set forth in claim 12 wherein said ring is of tempered steel.

* * * * *